US008631246B2

(12) United States Patent
Nolte et al.

(10) Patent No.: US 8,631,246 B2
(45) Date of Patent: Jan. 14, 2014

(54) METHOD FOR STARTING A KEYBOARD OF A SELF-SERVICE TERMINAL

(75) Inventors: Michael Nolte, Brakel (DE); Gerhard Osterholz, Salzkotten (DE); Daniela Sandschneider, Paderborn (DE); Matthias Runowski, Salzkotten (DE)

(73) Assignee: Wincor Nixdorf International GmbH (DE)

( * ) Notice: Subject to any disclaimer, the term of this patent is extended or adjusted under 35 U.S.C. 154(b) by 379 days.

(21) Appl. No.: 12/988,743

(22) PCT Filed: Apr. 3, 2009

(86) PCT No.: PCT/EP2009/002446

§ 371 (c)(1),
(2), (4) Date: Oct. 20, 2010

(87) PCT Pub. No.: WO2009/129919

PCT Pub. Date: Oct. 29, 2009

(65) Prior Publication Data

US 2011/0040984 A1 Feb. 17, 2011

(30) Foreign Application Priority Data

Apr. 26, 2008 (DE) ......................... 10 2008 021 046

(51) Int. Cl.

| | |
|---|---|
| ***G06F 11/30*** | (2006.01) |
| ***G07D 11/00*** | (2006.01) |
| *G06F 12/14* | (2006.01) |
| *G06Q 20/00* | (2012.01) |
| *G07F 19/00* | (2006.01) |
| *G06K 5/00* | (2006.01) |

(52) U.S. Cl.
USPC ............. 713/189; 345/172; 705/64; 235/379; 235/380

(58) Field of Classification Search
None
See application file for complete search history.

(56) References Cited

U.S. PATENT DOCUMENTS

| | | | | |
|---|---|---|---|---|
| 6,705,517 | B1 * | 3/2004 | Zajkowski et al. | 235/379 |
| 7,110,986 | B1 | 9/2006 | Zajkowski et al. | |
| 7,751,788 | B2 * | 7/2010 | Otani et al. | 455/186.2 |
| 8,052,049 | B1 * | 11/2011 | Doland et al. | 235/379 |
| 2003/0018893 | A1 | 1/2003 | Hess et al. | |
| 2007/0204173 | A1 | 8/2007 | Kuhn | |
| 2007/0277571 | A1 * | 12/2007 | Gokcebay | 70/278.1 |
| 2009/0119221 | A1 * | 5/2009 | Weston et al. | 705/76 |

FOREIGN PATENT DOCUMENTS

| | | | |
|---|---|---|---|
| DE | 3835624 | A1 | 4/1990 |
| DE | 4244106 | A1 | 6/1994 |
| EP | 0281058 | A2 | 9/1988 |

(Continued)

*Primary Examiner* — Nathan Flynn
*Assistant Examiner* — Trang Doan
(74) *Attorney, Agent, or Firm* — Harness, Dickey & Pierce, P.L.C.

(57) ABSTRACT

A method for commencing operation of an encrypted pin pad (EPP) of a self-service terminal. The EPP includes a security module that is capable of encrypting a confidential numeric code entered over the EPP with a PIN key. The EPP has a sensor that detects whether the EPP is installed properly in the self-service terminal or not. The sensor signal is scanned by the security module of the EPP. The EPP automatically goes to a non-operational mode if the sensor signal indicates that the EPP is not properly installed. The EPP, after passing from an operational to a non-operational mode, can only be returned to operation by entering an authorized activation code in the keypad security module.

20 Claims, 3 Drawing Sheets

(56) References Cited

FOREIGN PATENT DOCUMENTS

| | | | |
|---|---|---|---|
| EP | 1 124 206 | A1 | 8/2001 |
| EP | 1710760 | A1 | 10/2006 |
| EP | 1887503 | A1 | 2/2008 |
| WO | WO-2006/092113 | A1 | 9/2006 |

* cited by examiner (Section A-A)

METHOD FOR STARTING A KEYBOARD OF A SELF-SERVICE TERMINAL

CROSS-REFERENCE TO RELATED APPLICATIONS

This application is a National Stage of International Application No. PCT/EP2009/002446, filed Apr. 3, 2009. This application claims the benefit and priority of German application 10 2008 021 046.3, filed Apr. 26, 2008. The entire disclosures of the above applications are incorporated herein by reference.

BACKGROUND

This section provides background information related to the present disclosure which is not necessarily prior art.

1. Technical Field

The invention relates to a method for the secure commencement of operations of a keypad of a self-service terminal, specifically of an automated cash machine. The keypad of such an automated cash machine includes a security module that, by means of a PIN key stored in the security module, is capable of encrypting a confidential security number (PIN) that has been entered. The English term for this type of keypad is Encrypted Pin Pad (EPP). It prevents a confidential security number (PIN) from being transmitted unencrypted to a central computer center of a bank, for example. This keypad is disposed in a recess of a cover surface of the operating unit of the self-service terminal. In order to spy out the key strokes (and thus the PIN) of the user, keypad overlays are installed over the actual keypad by crooks. This keypad overlay involves a keypad prepared by the crooks by means of which the key strokes can be spied out. When installing such an overlay, the installed condition of the actual keypad is altered since the keypad is pressed down forcibly against the cover surface.

2. Discussion

For this reason, there are increased demands for security requiring that manipulation of this kind (altering the proper installation status of the keypad) is detected and the keypad is automatically disabled (locked) through the security module in the event of such manipulation.

Authorized removal of the keypad by a service technician for maintenance or repair, however, also results in the manipulation sensor system being triggered and the keypad is automatically disabled (locked), i.e. it goes from an operational mode to a non-operational mode.

SUMMARY OF THE INVENTION

Against this background, it is an object of the invention to cite a method that renders practicable a secure, simple and cost-effective resumption of operations following removal or manipulation.

In accordance with the invention, after the keypad passes from an operational mode to a non-operational mode, it can only be put into operation again when an authorized activation code is entered into the security module and verified by said module.

BRIEF DESCRIPTION OF THE DRAWINGS

The invention shall be explained in greater detail using the appended drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 3:
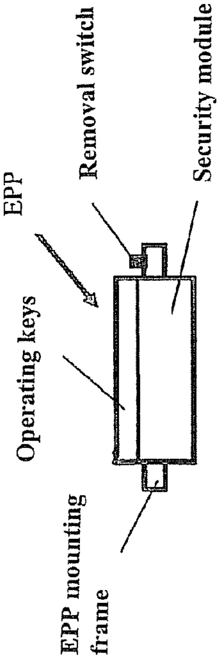
FIG. 3 shows a schematic section through the keypad with security module, FIGS. 4A/B show the two switch positions that display a proper or improper installation condition.
Figure 4A:
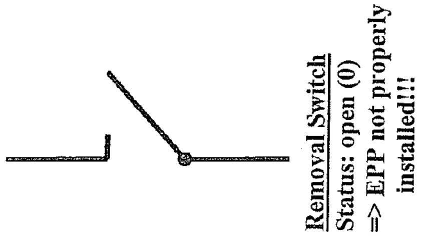
Figure 4B:
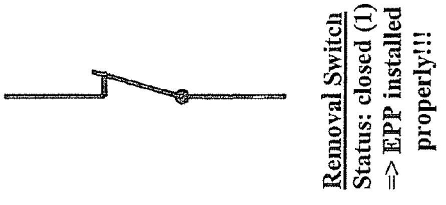
Figure 1:
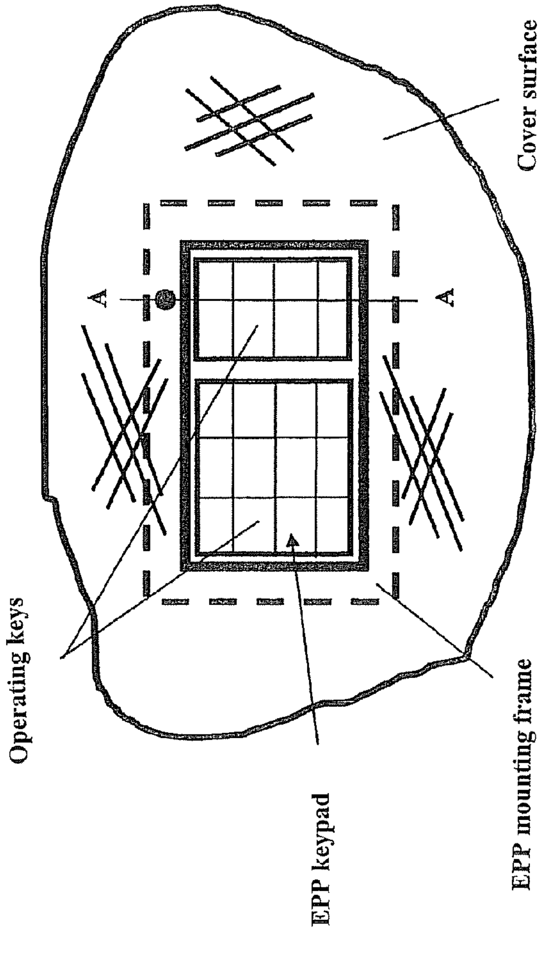
FIG. 1 shows a schematic plan view of a keypad installed in the cover surface of the operating unit of the self-service terminal.
Figure 2:
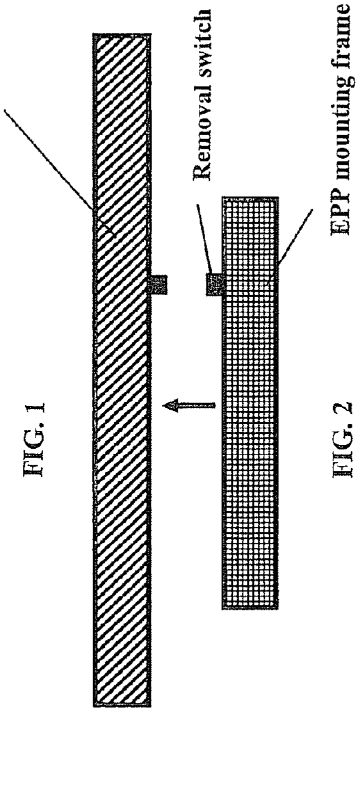
FIG. 2 shows a schematic representation of the EPP mounting frame with a switch disposed thereon to detect manipulation and the cover surface of the operating unit disposed over said frame.

FIG. 1 shows a schematic plan view of a keypad installed in a recess of the cover surface of the operating unit of the self-service terminal. The EPP keypad consists of its operating keys and the security module disposed therebelow. For installation into the cover surface of the operating unit, the EPP keypad has a mounting frame that is screwed to the cover surface (cover plate) by a threaded connector (not shown). The sensor that detects whether the keypad has been property installed in the self-service terminal is preferably located on the mounting frame, whereby the sensor signal is scanned by the keypad security module. The removal sensor can be a mechanical microswitch, the switch status of which is scanned electrically. An open removal switch (symbolized by the status: 0) means that the keypad is not properly installed, while a closed removal switch (symbolized by the status: 1) means that the keypad is properly installed. The allocation of switch statuses can naturally be reversed. A pin that presses on the removal switch in the correctly installed condition can be provided on the side of the cover surface facing the removal switch to actuate the removal switch.

In the event of manipulation during which the keypad is pressed forcibly down relative to the cover surface, the removal switch is opened, which in turn results in the keypad being automatically disabled (locked) in the security module of the keypad where the switch status is scanned.

The same situation (opening the switch) results, however, when the keypad is removed by a service technician in the event of service or repair.

In order to resume operations with the keypad following removal for service or repair, it is not sufficient for the switch to be closed again after the keypad has been properly installed. In accordance with the invention, the intention is that an activation code (FC) generated by an authorizing site has to be entered into the keypad security module and verified there.

Figure 5:
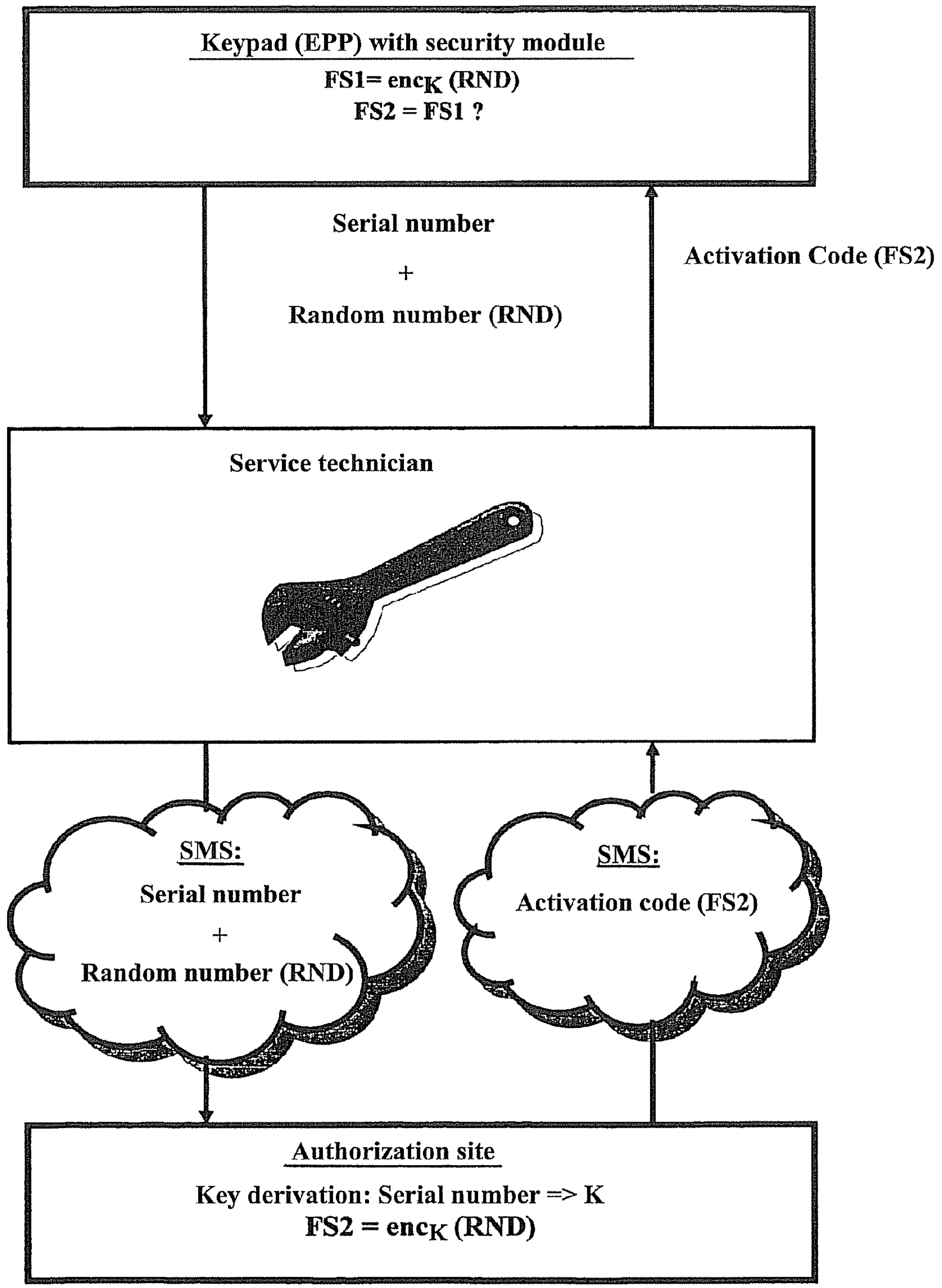
FIG. 5 shows a block diagram to clarify the method.

The method for generating and verifying the activation code (FC) is shown in FIG. 5. A random number (RND) is generated in the keypad security module and issued to the service technician along with a keypad code unambiguously identifying the keypad (e.g. serial number). The service technician starts a software routine in the keypad security module over a suitable interface to generate the random number (RND) and to issue the keypad serial number. Issuing/transmitting the random number (RND) and the serial number to the service technician can take place on various routes; for example, they can be displayed to the service technician visually on a monitor or transmitted onto an electronic storage device of the service technician.

The random number (RND) and the serial number are now transmitted via the service technician to a spatially distantly located central authorization site. This can be accomplished, for example, in the form of an SMS (Short Message Service) over a mobile telephone link. However, telephone transmission of these data (random number and serial number) or transmission by fax is also possible. Moreover, it is also possible to transmit the random number (RND) and serial number to the authorization site by an Internet connection.

Using the serial number, a key (K) is derived to encrypt the random number (RND) at the authorization site. The random number (RND) is encrypted using the key (K) by applying a specific encrypting program (algorithm) to create the activation code (FC): $FC=enc_K(RND)$. In doing this, the activation code computed at the authorization site is designated as FC2 to distinguish it from the activation code computed in the security module—see below. The activation code computed in this manner (FC2) is now transmitted by the authorization site to the service technician. This can also be managed in the form of an SMS message, for example, or by a different telephone or Internet connection. The activation code (FC2) thus received is entered by the service technician over a suitable interface into the keyboard security module. In so doing, he can, for example, use the operating keys on the keypad to make the entry. The activation code (FC2) entered is now verified in the keypad security module. For this purpose, the random number (RND) is encrypted according to the same algorithm and using the same specific key (K) for the keypad code as at the authorization site. Then the activation code (FS2) entered in the keypad (EPP) security module is compared with the activation code (FS1) calculated in the security module itself. If the two agree, the keypad can resume operations again under specific conditions.

The method in accordance with the invention has the advantage that, after being locked because of an improper installation situation, the keypad can be easily and securely put back into operation remotely. Secure resumption of operations therefore does not require that the keypad has to be sent to the keypad maker in order to effect a resumption of operations (activation) on site in a secure environment. The method in accordance with the invention thus saves time and costs.

Figure 6:
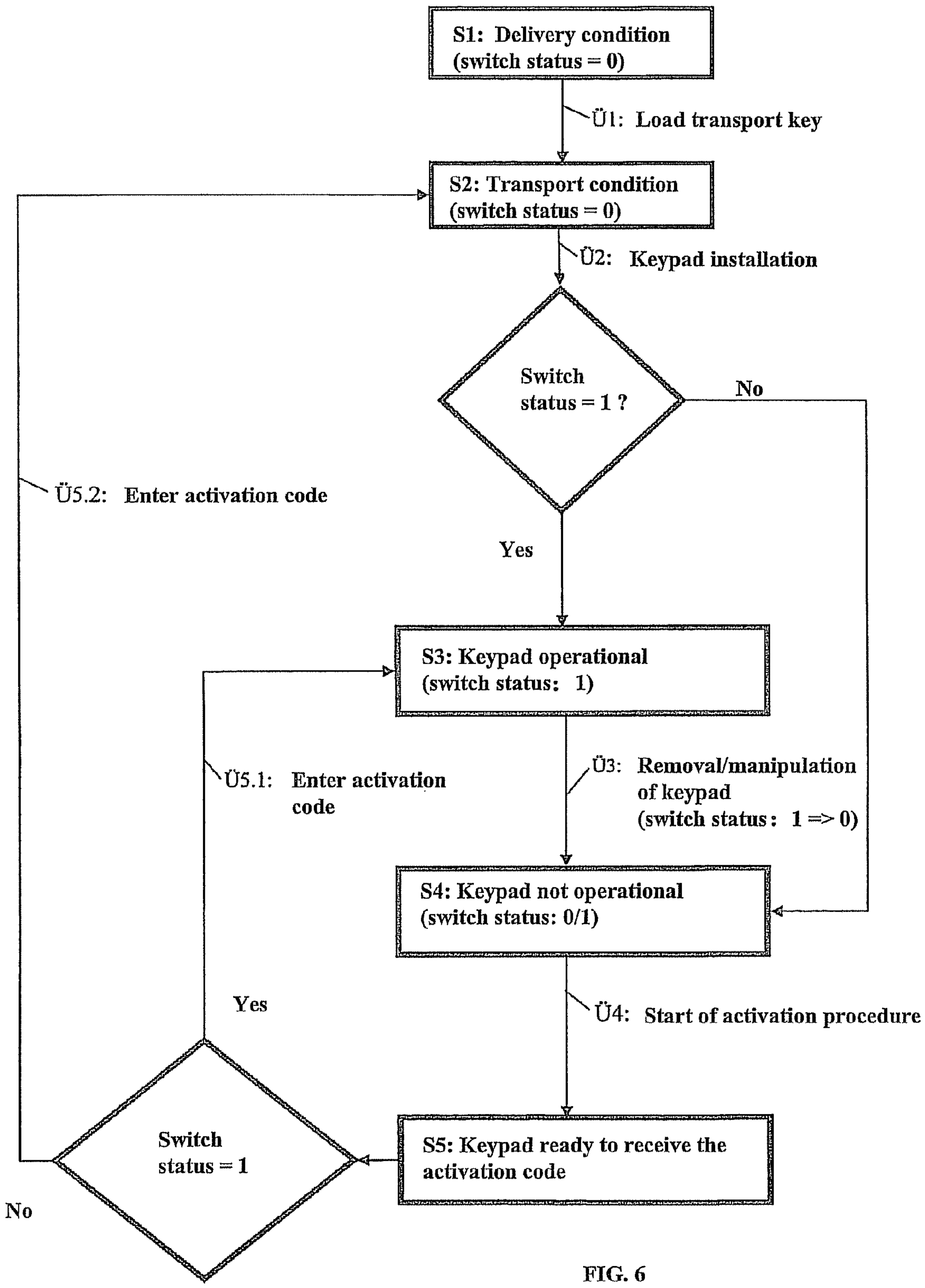
FIG. 6 shows a flow chart to clarify the method.

The various conditions for a keypad are shown in FIG. 6 using a flow chart and the transitions between these states are explained.

After it has been produced, the keypad is in what is called a delivery mode (S1). In this mode, the removal switch is open (switch status=0). After a transportation key (Ü1) is loaded into the keypad security module, the keyboard goes into a transportation mode (S2). After it has been properly installed in a self-service terminal, during which the switch is closed, the keypad can be transferred automatically into an operational mode under specific conditions. With the "local" loading of the PIN key that is required to encrypt the confidential security number (PIN) entered by the user through the keypad, the removal switch and/or the switch scan is activated through the security module. "Local" loading of the PIN key—in contrast to the preloading of the PIN key at a central key loading site—is understood to mean loading the PIN key at the site of the self-service terminal. During "local" loading, the PIN key can be entered manually on-site into the security module and by remote key loading (Remote Key Loading) secured through encryption. If the PIN key was loaded "locally" and the keypad was installed properly, i.e. the removal switch was closed (switch status=1), the keypad automatically goes into operational mode (S3) when a corresponding switch status scan by the security module confirms the closed switch status. However, if the removal switch scan detects the open switch status, the keypad automatically goes into non-operational mode (S4) in which the keypad is locked. For security reasons, the keypad automatically goes into non-operational mode (S4) when the removal switch scan in fact detects the closed switch status but the PIN key was preloaded at a central key loading site. For keypads with centrally preloaded PIN keys, therefore, even with proper installation, operation should commence only after authorized activation (see below).

A keypad in operational mode (S3) detects a change in the removal switch status from closed (1) to open (0) during removal or manipulation (Ü3) of the keypad. This automatically results in the keypad being taken to the non-operational mode (S4). In this condition, the keypad is locked. This mode can be indicated in one embodiment by visual information, for example a flashing LED.

In order to be able to resume operations with a keypad from the non-operational mode (S4), a service technician must initiate the activation procedure (see FIG. 5) in accordance with the invention (Ü4). For this to happen, the keypad security module is requested to issue the random number (RND) and the keypad code (serial number). Then the keypad goes into an activation code reception mode (S5). If the keypad was installed properly (switch closed; switch status=1) and an authorized activation code (FC) was entered, the keypad automatically goes into operational mode (S3) again (see path Ü5.1). However, provision is also made for the keypad to be taken to shipping mode (S2) after an authorized activation code (FC) is entered if the keypad is in a repair facility or in interim storage (path Ü5.2).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A keypad (EPP) of a self-service terminal comprising:

a security module that is configured to encrypt a confidential numeric code (PIN) entered over the keypad (EPP) by means of a PIN key;

a sensor that detects whether the keypad (EPP) is installed properly in the self-service terminal or not; and a sensor configured to transmit a sensor signal that is configured to be scanned by the security module of the keypad (EPP);

wherein the keypad (EPP) automatically goes to a non-operational mode if the sensor signal indicates that the keypad (EPP) is not properly installed; and wherein the keypad (EPP), after passing from an operational to a non-operational mode can only be returned to operation by entering an authorized activation code (FC) in the keypad security module.

2. The keypad (EPP) of claim 1, wherein a keypad code (serial number) unambiguously identifying said keypad (EPP) and a random number (RND) are issued by the keypad security module and transmitted to an authorization site, the random number (RND) is encrypted at the authorization site using a specific key (K) for the keypad code to create the activation code (FS): FS=$enc_K$(RND).

3. The keypad (EPP) of claim 2, wherein the authorization site transmits the activation code (FS) to be entered into the security module, the random number (RND) is encrypted in the keypad (EPP) security module according to the same algorithm and using the same specific key (K) for the keypad code as at the authorization site, wherein the activation code (FS2) entered into the security module of the keypad (EPP) is compared with the activation code (FS1) calculated in the security module itself.

4. The keypad (EPP) of claim 1, wherein for an initial commencement of operation of the keypad (EPP) the security module can be brought to a transport mode, and the keypad automatically then goes into the operational mode following proper installation in the self-service terminal and loading of the PIN key into the security module (M).

5. The keypad (EPP) of claim 1, wherein for the keypad (EPP) to resume operations, said keypad can be brought to the transport mode after the activation code (FC) is entered, where the keypad (EPP) then automatically goes into the operational mode following proper installation in the self-service terminal and loading of the PIN key into the security module.

6. The keypad (EPP) of claim 1, wherein the keypad code (serial number) issued by the keypad security module and the random number (RND) are transmitted over a telephone connection or an Internet connection to the authorization site.

7. The keypad (EPP) of claim 1, wherein the activation code (FS2) is transmitted from the authorization site over a telephone connection or an Internet connection to be entered into the security module (M) of the keypad (EPP).

8. The keypad (EPP) of claim 1, wherein after entry of the activation code has failed n times the current activation code (FS) for commencing operations or for the resumption of operations is blocked.

9. The keypad (EPP) of claim 1, wherein a removal switch is used as the sensor.

10. The keypad (EPP) of claim 1, wherein the non-operational status of the keypad is indicated by visual information.

11. A method for commencing operation of a keypad (EPP) of a self-service terminal comprising:

monitoring a sensor signal with a security module of a keypad (EPP), the security module is configured to encrypt a confidential numeric code (PIN) entered using the keypad (EPP), the sensor signal is generated by a sensor of the keypad (EPP) that detects whether the keypad (EPP) is physically installed properly in the self-service terminal;

configuring the keypad (EPP) in an operational mode when the sensor signal indicates that the keypad (EPP) is properly installed in the self-service terminal;

configuring the keypad (EPP) in a non-operational mode when the sensor signal indicates that the keypad (EPP) is not properly installed in the self-service terminal; and moving the keypad (EPP) from the non-operational mode to the operational mode upon entry of an authorized activation code (FC) in the keypad security module.

12. The method of claim 11, further comprising:

generating a keypad code unique to the keypad (EPP) and a random number using the security module;

transmitting the keypad code and the random number to a remote authorization site over a network; and encrypting the random number (RND) at the authorization site to create the activation code.

13. The method of claim 11, wherein the sensor generates an open signal indicating that the keypad (EPP) is not properly installed when the keypad (EPP) is depressed below a cover surface of the self-service terminal.

14. The method of claim 11, wherein the sensor generates an open signal indicating that the keypad (EPP) is not properly installed when the keypad (EPP) is removed from a cover surface of the self-service terminal.

15. A keypad (EPP) of a self-service terminal comprising:

operating keys;

a security module configured to encrypt a PIN code entered into the keypad (EPP) using the operating keys;

a mounting frame; and a sensor mounted to the mounting frame, the sensor transmits a sensor signal to the security module identifying whether the keypad (EPP) is properly installed in the self-service terminal;

wherein the keypad (EPP) is in an operational mode when the sensor signal indicates that the keypad (EPP) is properly installed in the self-service terminal;

wherein the keypad (EPP) is in a non-operational mode when the sensor signal indicates that the keypad (EPP) is not properly installed in the self-service terminal; and wherein the keypad (EPP) moves from the non-operational mode to the operational mode upon entry of an authorized activation code (FC) in the keypad security module.

16. The keypad (EPP) of claim 15, wherein the sensor indicates that the keypad (EPP) is not properly installed in the self-service terminal when the keypad (EPP) is depressed beneath a cover surface of the self-service terminal.

17. The keypad (EPP) of claim 15, wherein the sensor indicates that the keypad (EPP) is not properly installed in the self-service terminal when the keypad (EPP) is removed from the self-service terminal.

18. The keypad (EPP) of claim 15, wherein the sensor includes a removal switch at the mounting frame of the keypad (EPP).

19. The keypad (EPP) of claim 15, wherein the security module is configured to generate a keypad code unique to the keypad (EPP) and a random number, and transmit both the keypad code and the random number to a remote authorization site through a network, the random number is encrypted at the authorization site to generate the authorized activation code (FC).

20. The keypad (EPP) of claim 15, wherein the sensor includes a first portion mounted to the mounting frame and a second portion mounted to a cover surface of the self-service terminal, the sensor signal indicates that the keypad (EPP) is properly installed in the self-service terminal when the first portion contacts the second portion, and the sensor signal indicates that the keypad (EPP) is not properly installed in the self-service terminal when the first portion is not in contact with the second portion.

* * * * *